May 5, 1959
D. E. GILES
2,884,944
STEAM TRAPS
Filed June 6, 1956
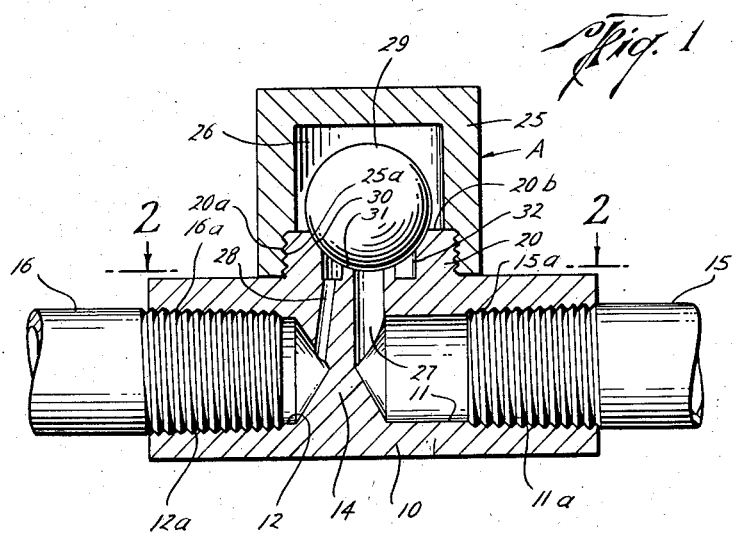
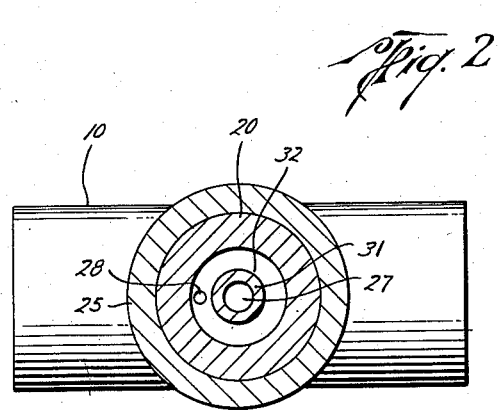
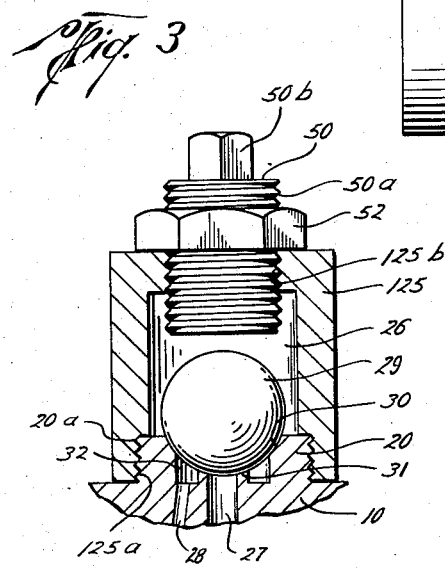
David E. Giles
INVENTOR.
BY Hayden & Pravel
ATTORNEYS United States Patent Office 2,884,944
Patented May 5, 1959

2,884,944
STEAM TRAPS
David E. Giles, Pasadena, Tex.
Application June 6, 1956, Serial No. 589,740
5 Claims. (Cl. 137—204)

This invention relates to new and useful improvements in steam traps.

An object of this invention is to provide a new and improved steam trap which is adapted to automatically and periodically discharge condensate from a steam line.

An important object of this invention is to provide a new and improved steam trap which includes a ball valve for controlling the discharge of steam condensate from a steam line, said ball valve being automatically seated and unseated in accordance with certain changes in the steam pressure above and below the ball valve.

Another object of this invention is to provide a new and improved steam trap which is adapted to automatically discharge condensate from a steam line and which has means for adjusting the time intervals between successive openings and closings of the trap.

A further object of this invention is to provide a new and improved steam trap wherein a ball valve is employed which is adapted to seat on a curved annular valve seat, whereby said ball valve and said seat wear together in a conforming curvature so as to maintain sealing engagement therewith throughout prolonged periods of use.

Still another object of this invention is to provide a new and improved steam trap wherein a ball valve is positioned in a chamber for closing both the inlet and the outlet to the chamber, such ball valve preferably contacting its valve seat at a point below the lateral center thereof so that a greater area of the ball is exposed to the pressure in said chamber than to the pressure in said inlet, whereby said valve remains seated or closed until the pressure in said inlet exceeds the pressure in said chamber by an amount sufficient to overcome the difference in the exposed areas.

The construction designed to carry out the invention will be hereinafter described, together with other features thereof.

The invention will be more readily understood from a reading of the following specification and by reference to the accompanying drawings forming a part thereof.

Figure 1 is a view, partly in elevation and partly in section, illustrating one form of the steam trap of this invention.

Figure 2 is a horizontal sectional view taken on line 2—2 of Figure 1.

Figure 3 is a view, partly in section and partly in elevation, illustrating a portion of a second form of the steam trap of this invention.

In the drawings, the letter A designates generally the steam trap of this invention. Such steam trap A has a tubular body 10 which has an inlet opening 11 and an outlet or discharge opening 12 formed therein with a wall or separator 14 formed therebetween. As will be explained in detail, the steam trap A is connected to a pipe 15 which extends from a steam line (not shown) so that steam under pressure from the steam line is admitted into the inlet opening 11 of the steam trap A along with any condensate which has formed in the steam line. Briefly, the steam trap A is constructed for automatically and periodically establishing fluid communication between the inlet opening 11 and the outlet opening 12 for periodically discharging the condensate or other liquid formed in the steam line and the inlet pipe or line 15. A discharge pipe 16 which ordinarily is open to atmospheric pressure is connected to the discharge or outlet opening 12 of the body 10 so that the condensate is released or blown off. Also, as will be explained, after the condensate has been discharged or blown off, the fluid communication between the inlet opening and the outlet or discharge opening 12 is closed so that the further escape of steam from the steam line and the steam pipe 15 is prevented until further condensate has formed in the steam line and the steam pipe 15.

Considering the invention more in detail, and referring to Figures 1 and 2 particularly, the inlet opening 11 is provided with internal threads 11a which are adapted to interengage with external threads 15a on the tube or pipe 15. Similarly, the outlet or discharge opening 12 is provided with internal threads 12a which are adapted to receive and interengage with external threads 16a on the exhaust or discharge pipe 16.

The body 10 is provided with a lateral circular projection 20 which has external threads 20a formed thereon. A hollow cap 25 which has internal threads 25a at its lower end is threaded onto the threads 20a so as to provide a chamber 26 on the side of the tubular housing 10.

An inlet passage 27 extends laterally from the longitudinal inlet opening 11 for establishing fluid communication between the chamber 26 and the inlet opening 11. An outlet passage 28 extends laterally from the longitudinal outlet or discharge opening 12 to establish fluid communication between the chamber 26 and the outlet or discharge opening 12. A ball valve 29 is positioned in the chamber 26 and is adapted to close the inlet passage 27 and the outlet passage 28 to close off the fluid communication therebetween so as to also close the fluid communication between the inlet opening 11 and the outlet opening 12 through the chamber 26.

Such valve 29 is in the shape of a ball and it closes the passages 27 and 28 by seating on a valve seat which is made up of two annular valve seat surfaces 30 and 31 which are curved downwardly to conform with the external surface of the lower segmental portion of the ball 29. The annular valve seat surface 31 surrounds the inlet passage 27 at its upper end, and the annular valve seat surface 30 also surrounds the upper end of the inlet passage 27, but such surface 30 is disposed outwardly from the surface 31. An annular groove 32 divides the valve seat surfaces 30 and 31 so that each of such surfaces 30 and 31 has an area which is as small as possible while still providing sufficient surface area for sealing contact by the ball valve 29. A minimum area of the contact with the external surface of the ball valve 29 is thus provided to increase the tendency for uniform wearing of the surface of the ball valve 29 and the valve seat surfaces 30 and 31 during use. Thus the ball valve 29 has a curved external surface which conforms with the valve seat surfaces 30 and 31 which construction in itself facilitates uniform wearing of the ball valve 29 and the seat surfaces 30 and 31 as compared to flat surfaces, but in addition, the minimum area provided by the surfaces 30 and 31 improves such conforming quality during wear.

The outlet passage 28 is in fluid communication with the annular groove 32 (Figures 1 and 2).

In the use or operation of the steam trap of this invention, such trap A is connected to the steam pipe 15 which extends from a steam line (not shown). Ordinarily, when it is desired to feed the steam to equipment being operated thereby it is desirable to have high quality steam so that the condensate must be removed prior to the admitting of the steam into the equipment. Therefore, one or more of the steam traps A could be used ahead of such equipment. In other instances, such as equipment wherein the heat of the steam is being primarily utilized, the steam trap A is located on the steam line coming from the equipment so that the condensate collects and is discharged therefrom. The manner of connecting the steam trap A to the steam line may be varied within the skill of the art, but ordinarily the steam pipe 15 extends laterally from the main steam line and a T connection is utilized between the steam pipe 15 and the main steam line.

Assuming that the steam trap A has been connected to a steam line, the steam would initially force the ball valve 29 upwardly to admit steam into the chamber 26. Some of the steam under pressure would escape from the chamber 26 and would pass outwardly through the outlet passage 28 and the outlet or discharge opening 12. However, the restriction offered by the discharge passage 28 prevents the steam from passing outwardly as fast as it enters through the inlet passage 27 which is of a considerably larger diameter than the outlet passage 28. A build up of fluid pressure in the chamber 26 is thus obtained and the heat from the steam flowing into the chamber 26 heats the cap 25. The cap 25 has a much greater thickness than the thickness of the steam pipe 15 or the steam line (not shown) connected thereto so that the cap 25 retains the acquired heat from the steam for a longer period than the metal of the pipe 15 or the steam line. When the pressure in the chamber 26 exceeds the steam pressure in the line or pipe 15, the ball 29 is forced downwardly to a seated position to close the passages 27 and 28. The pressure in the chamber 26 exceeds the pressure in the steam line, steam pipe 15, and the inlet passage 27 because the acquired heat of the cap 25 is transmitted to the steam in the chamber 26. The valve 29 is maintained in its seated position because of the excess steam pressure and because a larger area of the ball valve 29 is exposed to the pressure in the chamber 26 than is exposed to the pressure in the steam line and the inlet passage 27.

The ball valve 29 is held in its closed position until the fluid pressure in the chamber is reduced sufficiently so that the pressure in the inlet opening 11 from the steam pipe 15 is sufficient to overcome such fluid pressure and lift the ball valve 29 from its valve seat provided by the valve seat surfaces 30 and 31. The pressure in the chamber 26 is reduced as the steam in such chamber 26 cools. The cooling of the steam in the chamber 26 occurs because the cap 25 is exposed to the lower temperature area externally thereof so that the acquired heat from the steam in the thickness of the metal cap 25 is gradually lost and a cooling of the steam in the chamber 26 results. As the steam in the chamber 26 cools it condenses to form condensate and therefore the pressure in the chamber 26 is reduced.

While the pressure in the chamber 26 is being reduced by the cooling of the steam in such chamber 26, the condensate in the steam line 15 from the main steam line is also forming and since the steam line and the steam pipe 15 have a much smaller thickness of metal than the cap 25, a considerable amount of condensate may form in the line 15 prior to the reduction of the pressure in the chamber 26 sufficiently for the ball valve 29 to be unseated again by the steam pressure from the steam line. When the reduction in pressure in the chamber 26 is sufficient to permit the steam pressure to raise the ball valve 29, the condensate in the steam line and the steam pipe 15 is discharged or blown out through the inlet passage 27, outlet passage 28, outlet opening 12 and exhaust pipe 16 to remove such condensate from the steam line. Also, there is again a build up of steam pressure within the chamber 26 and a reheating of relatively thick metal of the cap 25 until the pressure in the chamber 26 is sufficient to again reseat the valve 29 on the valve seat surfaces 30 and 31.

In Figure 3, a modification of the steam trap of Figures 1 and 2 is illustrated, wherein means are provided for adjusting the volume of the chamber 26 to change the time interval between each opening and closing of the ball valve 29. Such means for adjusting the volume in the chamber 26 includes a plug 50 which has external threads 50a which are adapted to interengage with internal threads 125b on the hollow cap 125. The plug 50 is rotated to move same into and out of the chamber 26 so as to change the volume thereof. Wrench flats or surfaces 50b are provided at the upper end of the plug 50 so that a wrench may be used for effecting the rotational movement of the plug 50. A lock nut 52 is threaded on the threads 50a of the plug 50 so as to lock the plug 50 in a selected position. The other parts of the steam trap shown in Figure 3 are the same as the parts shown in Figures 1 and 2 and the same parts have like numerals.

In the operation or use of the form of invention shown in Figure 3, the ball valve 29 is unseated and reseated in the same manner as described above in connection with Figures 1 and 2. If it is desired to shorten the time interval between the successive openings and closings of the valve 29, the plug 50 is threaded inwardly to reduce the volume of the chamber 26. By so reducing the volume of the chamber 26, less steam is accumulated therein after each discharge of the condensate and therefore it takes less cooling time to condense the steam collected in the chamber 26, whereby the pressure in the chamber 26 is reduced sufficiently to unseat the valve 29 in a shorter time than if the volume is larger in such chamber 26. Conversely, if it is desired to increase the time interval between the successive openings and closings of the valve 29, the plug 50 is threaded outwardly to increase the volume of the chamber 26.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A steam trap adapted to be connected to a steam line, comprising a body having an inlet opening and a discharge opening, said body having an inlet passage extending laterally from said inlet opening and in fluid communication therewith, said body also having an outlet passage extending laterally from said discharge opening and in fluid communication therewith, a hollow cap connected to said body to form a closed chamber in fluid communication with said inlet passage and said outlet passage, and a ball valve in said chamber for seating over both said outlet passage and said inlet passage for closing the fluid communication from said inlet passage to said outlet passage, a first annular valve seat formed on the external surface of said body over said inlet passage, an annular groove surrounding said first annular valve seat and in fluid communication with said outlet passage, a second annular valve seat formed on the external surface of said body surrounding said annular groove and said first annular valve seat, and each of said valve seats being curved to conform with the external surface of a segmental portion of the ball valve so that said ball valve is adapted to engage said first annular valve seat and said second annular valve seat and to simultaneously cover said annular groove therebetween for closing off fluid flow between said inlet passage and said outlet passage.

2. The structure set forth in claim 1, wherein said ball valve has the major portion thereof positioned above said valve seat to expose a larger external area thereof to the pressure of the fluid in the chamber than to the pressure of the steam in the inlet passage so that said ball valve is maintained in a seated position on the valve seat with a lesser pressure in the chamber than in the inlet passage.

3. The structure set forth in claim 1, wherein said inlet opening is larger than said outlet opening so as to effect a build up of pressure in said chamber when said ball valve is unseated.

4. The structure set forth in claim 1, including means connected with said hollow cap for changing the volume of said chamber to thereby regulate the time intervals between successive openings and closings of said valve.

5. The structure set forth in claim 1, including a plug extending into said chamber, and means connecting said plug to said cap for moving said plug into and out of said chamber for adjusting the volume of said closed chamber to thereby regulate the time intervals between successive openings and closings of said valve.

References Cited in the file of this patent

UNITED STATES PATENTS

| | | |
|---|---|---|
| 203,590 | Colborne | May 14, 1878 |
| 1,307,207 | Mitchell | June 17, 1919 |
| 1,935,978 | Harbison | Nov. 21, 1933 |
| 2,207,681 | Hibner | July 9, 1940 |
| 2,634,744 | Wells | Apr. 14, 1953 |
| 2,709,450 | Holm et al. | May 31, 1955 |
| 2,817,353 | Midgette | Dec. 24, 1957 |

FOREIGN PATENTS

| | | |
|---|---|---|
| 118,196 | Australia | Feb. 28, 1944 |